(12) United States Patent
Käthler et al.

(10) Patent No.: US 10,064,487 B2
(45) Date of Patent: Sep. 4, 2018

(54) PULL-OUT GUIDE FOR FURNITURE PARTS THAT CAN BE MOVED IN RELATION TO EACH OTHER

(71) Applicant: PAUL HETTICH GMBH & CO. KG, Kirchlengern (DE)

(72) Inventors: Andreas Käthler, Kirchlengern (DE); Steffen Jaekel, Hiddenhausen (DE); Thomas Franke, Bünde (DE); Janine Mertens, Bünde (DE); Reinhard Büscher, Bünde (DE)

(73) Assignee: PAUL HETTICH GMBH & CO. KG, Kirchlengern (DE)

( * ) Notice: Subject to any disclaimer, the term of this patent is extended or adjusted under 35 U.S.C. 154(b) by 0 days.

(21) Appl. No.: 15/320,947

(22) PCT Filed: Jun. 25, 2015

(86) PCT No.: PCT/EP2015/064336
§ 371 (c)(1),
(2) Date: Dec. 21, 2016

(87) PCT Pub. No.: WO2015/197743
PCT Pub. Date: Dec. 30, 2015

(65) Prior Publication Data
US 2017/0150816 A1    Jun. 1, 2017

(30) Foreign Application Priority Data
Jun. 25, 2014    (DE) .................. 10 2014 108 854

(51) Int. Cl.
*A47B 88/40*    (2017.01)
*A47B 88/487*    (2017.01)
(Continued)

(52) U.S. Cl.
CPC .......... *A47B 88/487* (2017.01); *F16C 29/005* (2013.01); *F16C 29/04* (2013.01); *F16C 2314/72* (2013.01)

(58) Field of Classification Search
CPC ....... A47B 88/487; F16C 29/04; F16C 29/005
(Continued)

(56) References Cited

U.S. PATENT DOCUMENTS 4,351,575 A * 9/1982 Rock .................... A47B 88/493
                                                 312/334.12
5,417,496 A    5/1995 Hobbs
(Continued)

FOREIGN PATENT DOCUMENTS

| AT | 515039 | 5/2015 |
|----|--------|--------|
| DE | 3536654 | 8/2002 |
| EP | 1959794 | 4/2012 |
| EP | 1407691 | 8/2012 |
| WO | 2015109345 | 7/2015 |

OTHER PUBLICATIONS

International Search Report of PCT/EP2015/064336 dated Oct. 5, 2015.
(Continued)

*Primary Examiner* — James O Hansen
(74) *Attorney, Agent, or Firm* — Barnes & Thornburg LLP (57) ABSTRACT

A pull-out guide for furniture parts that can be moved in relation to each other includes at least two pull-out rails, each having at least one running surface, between which at least one first rolling element and at least one second rolling element are arranged. The rolling elements may be rotatably retained in at least one rolling-element cage. The at least one first rolling element and the at least one second rolling element of the rolling-element cage have an identical nominal diameter. The pull-out guide is distinguished in that at least one of the running surfaces has a free-running segment
(Continued)

in which the at least one first rolling element is positioned in a retracted state of the pull-out guide, the running surfaces having a greater distance from each other inside the free-running segment than outside the free-running segment.

11 Claims, 5 Drawing Sheets

(51) Int. Cl.
*F16C 29/00* (2006.01)
*F16C 29/04* (2006.01)

(58) Field of Classification Search
USPC ..... 312/330.1, 334.1, 334.7, 334.11, 334.17, 312/334.38
See application file for complete search history.

(56) References Cited

U.S. PATENT DOCUMENTS

| | | |
|---|---|---|
| 2006/0091770 A1 | 5/2006 | Ritter |
| 2008/0258592 A1 | 10/2008 | Blum |
| 2016/0242545 A1 | 8/2016 | Violand |
| 2016/0316911 A1 | 11/2016 | Berchtold et al. |

OTHER PUBLICATIONS

English translation of International Search Report of PCT/EP2015/064336 dated Oct. 5, 2015.
Search Report issued in German Application No. 102014108854.9 dated Oct. 5, 2015.

\* cited by examiner

PULL-OUT GUIDE FOR FURNITURE PARTS THAT CAN BE MOVED IN RELATION TO EACH OTHER

CROSS REFERENCE TO RELATED APPLICATIONS

This application is a U.S. nationalization under 35 U.S.C. § 371 of International Application No. PCT/EP2015/064336, filed Jun. 25, 2015, which claims priority to German Application No. 102014108854.9 filed Jun. 25, 2014.

BACKGROUND AND SUMMARY OF THE DISCLOSURE

The disclosure relates to a pull-out guide for furniture parts that can be moved in relation to each other, comprising at least two pull-out rails having at least one running surface. At least one first rolling element and at least one second rolling element are arranged between the pull-out rails, which rolling elements are rotatably retained in a rolling-element cage, wherein the at least one first rolling element and the at least one second rolling element have an identical nominal diameter.

Pull-out guides for furniture parts that can be moved in relation to each other such as drawers which are movably mounted in a furniture body are known from the prior art, e.g. from the publication DE 3 536 654 C2. Rotatably mounted cylindrical rollers or balls are used as rolling elements in the rolling-element cage. "Hard" steel balls or rollers are frequently used because they allow smooth guidance even under high mechanical loads by a heavy weight which is movably held by the pull-out guide. A loud rolling noise can be disadvantageous however.

For the purpose of reducing the rolling noises, it is known to use plastic rolling elements in drawers which need not carry any exceptionally high weights. There is a problem in respect of the plastic rolling elements, however, that prolonged idle times can lead to a flattening of the rolling elements. The flattening of the plastic rollers is reversible. The plastic rollers are thoroughly kneaded by a subsequent actuation of the pull-out guide and assume their original form again. Vibrations occur initially as a result of the flattened portions and consequently to an increased running noise ("rumbling").

A pull-out guide for drawers is described in the publication EP 1 959 794 B1, in which rolling elements with different diameters are inserted. The pull-out rails of the pull-out guide are formed in such a way that in the closed state of the drawer only the first rolling element with the smaller diameter is loaded. For this purpose, one of the guide rails comprises an elevation facing the rolling elements in a front end region. After the opening of the drawers, the first rolling element leaves the region of the elevation so that subsequently the guide rails run on the second rolling elements with the greater diameter. In the closed state of the drawer, i.e. in a retracted state of the pull-out guide, only the first rolling element with the smaller diameter is loaded, as a result of which only this rolling element is subjected to a deformation. Since subsequently guidance occurs by means of the second rolling element with the greater diameter, the deformed first rolling element does not lead to an increased running noise.

It is disadvantageous in this assembly, however, that an additional rolling element is provided with the first rolling element, which is not loaded in the normal operation of the drawer. Said additional first rolling element leads to an increased input of material and thus additional costs with the consequence that it does not contribute to the running properties in normal operation. For example, it does not increase the maximum weight which can be carried by the pull-out guide.

The present disclosure illustrates and describes a pull-out guide in which an increased running noise after a prolonged idle time of the pull-out guide is suppressed, without providing additional rolling elements that are not used in normal operation.

A pull-out guide in accordance with the disclosure and of the type mentioned above is characterized in that at least one of the running surfaces has a free-running segment in which the at least one first rolling element is positioned in a retracted state of the pull-out guide, wherein the running surfaces have a greater distance from each other within the free-running segment than outside the free-running segment.

As such, the first rolling element may be engaged with both running surfaces outside the free-running segment and engaged with only one of the running surfaces within the free-running segment. Therefore, only the at least one second rolling element carries the load during the idle time. Accordingly, only the second rolling elements are potentially deformed during a prolonged idle time. If the pull-out guide is moved from the retracted state, the at least one first rolling element leaves the free-running segment, comes into engagement again with the two regular running surfaces and takes up the weight again that is carried by the pull-out rails or the load acting on the pull-out rails.

Since the first rolling elements have passed their idle time in the free-running segment, they do not contain any flattened portions, optionally in contrast to the second rolling elements. Even if the second rolling elements show flattened portions, said flattened portions do not impair the running properties because the distance of the pull-out rails from each other is determined by the first rolling elements. In the respective rotary position of the deformed second rolling elements, in which the flattened portions face the running rails, the upper carried pull-out rail does not follow the shape of the second rolling element but moves its weight entirely to the first rolling element.

In an embodiment of the pull-out guide, the free-running segment is formed as a bead, a recess, an embossed portion or as a ramp. The free-running segment thus formed is preferably integrated in one of the running surfaces. The aforementioned configurations represent embodiments of the free-running segment which are easy to realise and can be integrated in the running surfaces with ease.

In a further embodiment, the first rolling elements are not in contact with the two running surfaces in the retracted state of the pull-out guide, between which they are arranged. It is thus securely ensured that the first rolling elements are not deformed during an idle period.

In a further embodiment of the pull-out guide, the distance between the running surfaces within and outside the free-running segment differs by less than 10%, for example, by less than 5% of the diameter of the first and second rolling elements. These differences in distance may be adequately large for relieving the first rolling elements. At the same time, these differences in distance may be sufficiently small to be realised very well in the running surfaces and the guide rails without leading to influences on the dimensioning of the guide rails.

In a further embodiment of the pull-out guide, several first rolling elements and/or several second rolling elements are arranged within a rolling element cage one after the other in the longitudinal direction of the pull-out guide. The free-running segment may have a length which is at least as great as the maximum distance of two of the multiple first rolling elements. In addition, further rolling elements can be provided. As a result, the invention can be used in rolling element arrangements with several rolling elements.

In a further embodiment of the pull-out guide, the first and/or second rolling elements and/or optionally the further rolling elements consist of plastic. A reduced rolling noise of the pull-out guide can be achieved with plastic rolling elements. Since the rumbling noises which occur in the plastic rolling elements after a prolonged idle time can be prevented by the free-running segment in accordance with the invention, the plastic rolling elements are especially suitable within the scope of the invention. Since the first rolling elements which are not deformed after a prolonged idle time determine the distance of the running surfaces of interacting guide rails, a potential flattening of the second rolling elements does not lead to a rumbling noise. Plastic can therefore also be selected as the material for the second rolling elements within the scope of the invention.

In a further embodiment of the pull-out guide, the first and second rolling elements and optionally the further rolling elements differ from each other with respect to their geometry, their material, their hardness and/or their width. The further rolling elements can further differ with respect to their diameter from the first and second rolling elements. The free-running segment in accordance with the disclosure, in the case of a nominally identical diameter of the first and the second rolling elements, leads to the desired relieving effect of the first rolling elements in the retracted state of the pull-out guide.

Irrespective thereof, other material properties and/or geometries of the different rolling elements, and also different diameters for the further rolling elements, can be selected in order to achieve optimal running properties.

DETAILED DESCRIPTION OF THE DRAWINGS

Figure 1:
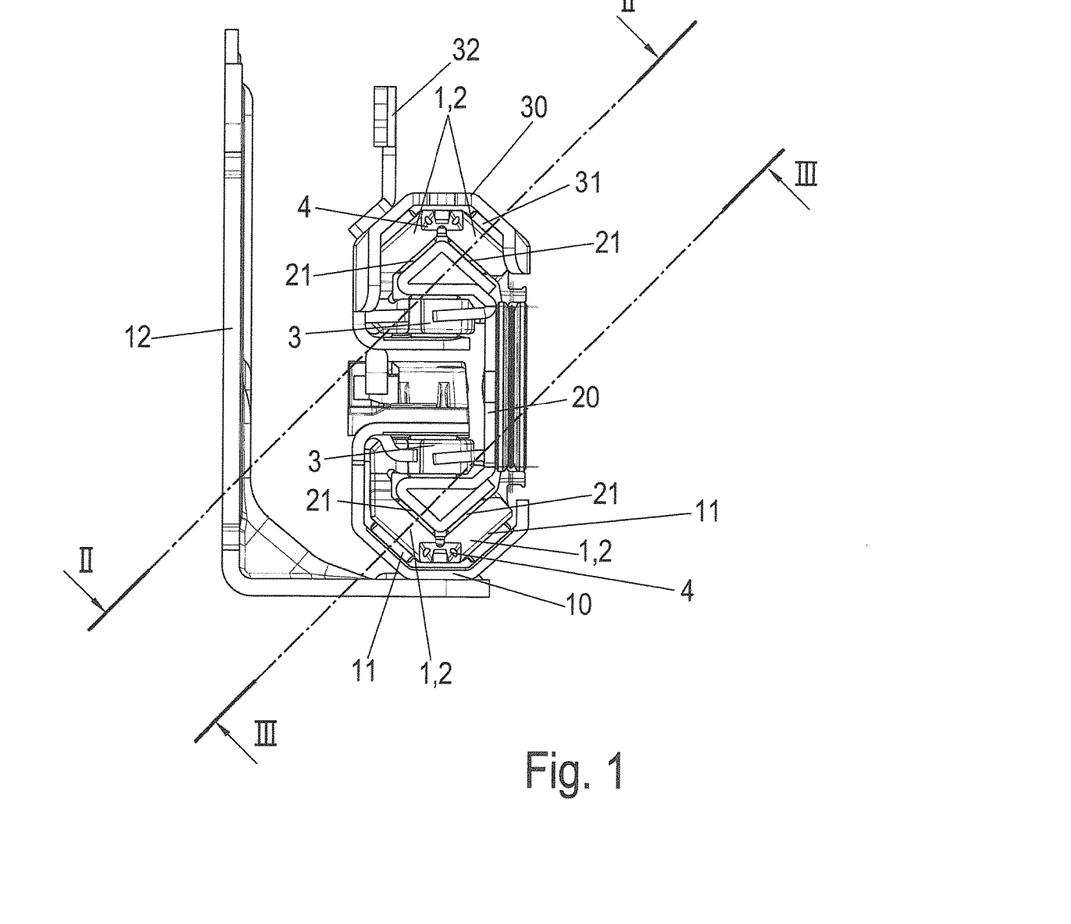
FIG. 1 shows an embodiment of a pull-out guide in a cross-sectional view.

FIG. 1 shows an embodiment of a pull-out guide in a cross-sectional view. The pull-out guide comprises three guide rails, i.e. an outer guide rail 10, which is also referred to below as body rail 10, a middle guide rail 20, which is also referred to below as middle rail 20, and an inner guide rail 30, which is also referred to below as running rail 30. The middle rail 20 is displaceably mounted via roller bearings relative to the body rail 10 and to the running rail 30. The first rolling elements 1, the second rolling elements 2 and further rolling elements 3 of the roller bearings are shown in FIG. 1 and are provided with reference numerals. The rolling elements 1, 2 and 3 are retained in rolling-element cages 4, which are only indicated in FIG. 1. The configuration of the pull-out guide as a so-called full-pullout guide with three guide rails is provided merely by way of example. The configuration of a pull-out guide in accordance with the disclosure can also be implemented when using only two guide rails, i.e. a so-called partial-extension guide.

In the illustrated embodiment, the body rail 10 is formed in an approximately C-shaped manner, wherein the open side of the C-shaped profile faces to the right in the illustration according to FIG. 1. Two or more mounting brackets 12 are fixed to the longitudinal side of the body rail 10 which is opposite the open side. They are used for fixing the body rail 10 to a furniture body such as a kitchen cabinet.

The running rail 30 is also formed in an approximately C-shaped manner in its profile, wherein it is downwardly open toward the middle rail 20. The running rail 30 comprises fixing means 32, with which it can be fixed to a movable furniture part such as a drawer.

The middle rail 20 is arranged vertically between the body rail 10 and the running rail 30. The middle rail 20 is formed in an approximately U-shaped manner, wherein the base of the U-shaped profile is arranged in a vertical manner. The width of the base determines the vertical distance between the running rail 30 and the body rail 10. The two legs of the U-shaped profile of the middle rail 20 each protrude into the inner region of the body rail 10 and the running rail 30. The roller bearings are arranged in this region.

A retraction and damping apparatus 40 is vertically arranged in the remaining free space between the body rail 10 and the running rail 30 and horizontally between the base of the U-shaped profile of the middle rail 20 and the mounting brackets 12 of the body rail 10. The arrangement of the guide rails 10, 20, 30 with respect to each other, as also the profiling of the said guide rails 10, 20, 30, is provided merely as an example. The retraction and damping apparatus 40 represents an optional element.

Each of the roller bearings between the body rail 10 and the middle rail 20 and between the middle rail 20 and the running rail 30 comprises three rows of cylindrical rolling elements 1, 2 and 3, which are oriented in a triangular arrangement with respect to each other. The further rolling elements 3 are rotatably mounted about a horizontal axis. The first and the second rolling elements 1, 2 are rotatably mounted in mutually V-like oriented rows with a rotational axis which is inclined in relation to the horizontal and the vertical. The rows with the first and second rolling elements 1, 2 are used for taking up the weight of the guided furniture part acting on the running rail 30. The further rolling elements 3 with the horizontal rotational axis do not take up the weight itself but a tilting moment produced by the weight when the pull-out guide is extended.

Figure 2:
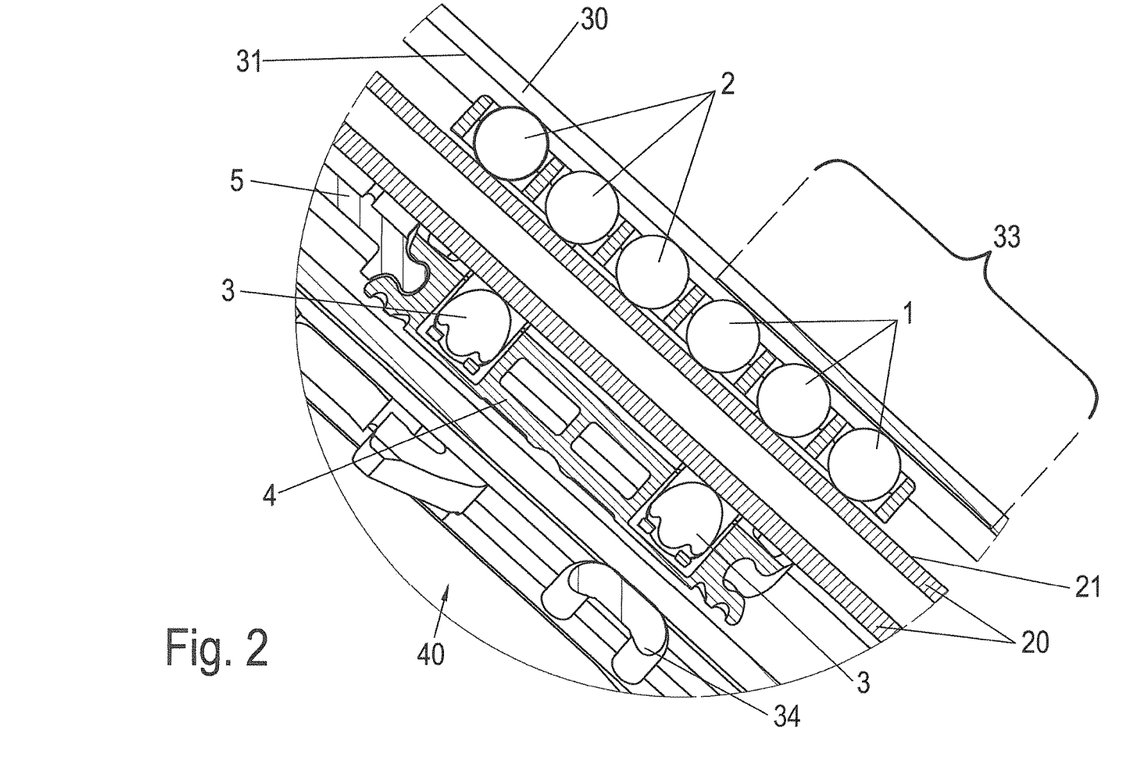
FIG. 2 shows a first longitudinal sectional view through the pull-out guide of FIG. 1.
Figure 3:
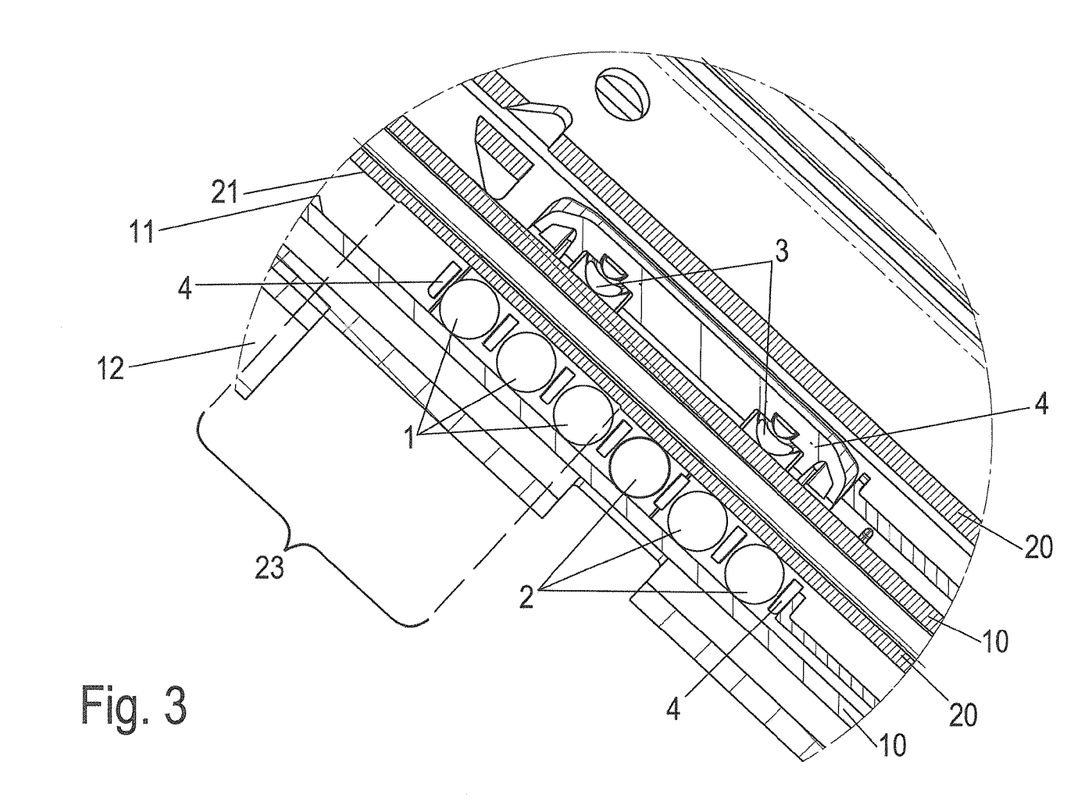
FIG. 3 shows a second longitudinal sectional view through the pull-out guide of FIG. 1, and FIGS. 4a to 4c each show a schematic view of the bearing region of a pull-out guide in different pull-out positions.

The configuration of the roller bearings is shown in closer detail in the longitudinal sectional views in FIGS. 2 and 3. The position of the respective sectional view is designated in FIG. 1 with respective Roman numerals.

FIG. 2 shows the sectional view through the roller bearing arranged between the middle rail 20 and the running rail 30. Only one row of the two rows of roller bearings with the roller bearings 1 and 2 is shown in this drawing, which row is provided with six rolling elements 1, 2 which are cylindrical in this case. In the third row of the rolling elements, which is used for taking up tilting moments, two of the further rolling elements 3 are rotatably arranged, which are shown in FIG. 2 in a partly sectional view. All rolling elements 1, 2, 3 are retained in the rolling-element cage 4. A further such rolling-element cage 4 with respective rolling elements 1 to 3 is provided between the running rail 30 and the middle rail 20, which rolling element cage is coupled at a distance from the illustrated rolling-element cage 4 via a connecting element 5. A part of the retraction and damping apparatus 40 can be recognised in the bottom region of FIG. 2, as well as a driver 34 which interacts therewith and is fixed to the running rail 30.

The first and the second rolling elements 1, 2 of the illustrated row of rolling elements roll off on a running surface 21 of the middle rail 20 and a running surface 31 of the running rail 30.

In the illustrated embodiment, three first rolling elements 1 and three second rolling elements 2 are provided. The first rolling elements 1 and the second rolling elements 2 each have the same diameter. They may be made of plastic, wherein the first rolling elements 1 and the second rolling elements 2 may be, but need not be, identical concerning their material. It is also possible to provide differently hard materials for the first rolling elements 1 and the second rolling elements 2. Furthermore, the first rolling elements 1 and the second rolling elements 2 can differ with respect to their geometry (e.g. cylindrical roller, ball) and/or their width.

FIG. 2 shows the position of the rolling-element cage 4 in a fully retracted position of the pull-out guide. In this position, the three first rolling elements 1 are positioned in a region of the running surface 31 of the running rail 30 in which a free-running segment 33 is formed in the running rail 30. The running surfaces 21 and 31 are spaced farther from each other within the free-running segment 33 than in the remaining region of the running rail 30 and the middle rail 20. The free-running segment 33 is formed here by a bead or recess in the running rail. It would also be possible to provide a free-running segment in the running surface 21 of the middle rail 20. The free-running segment 33 leads to the consequence that the first rolling elements 1 are relieved in the illustrated completely retracted position of the pull-out guide and only the second rolling elements 2 are loaded by the weight of the supported furniture part. The resulting advantages are explained in closer detail in connection with the schematic drawings of FIG. 4.

Similar to FIG. 2, FIG. 3 shows a section of a longitudinal sectional view through the pull-out guide of FIG. 1. The illustration shows the region of the roller bearing between the body rail 10 and the middle rail 20. The sectional view is positioned in such a way that a row of rolling elements equipped with the first rolling elements 1 and the second rolling elements 2 are shown by way of a full sectional view. The second one of the rolling element rows equipped with said rolling elements 1, 2 is not shown. The row of rolling elements equipped with two of the further rolling elements 3 is shown in a partly sectional view.

Then again, three first rolling elements 1 and three second rolling elements 2 are provided in the illustrated row of rolling elements. They roll off between a running surface 11 of the body rail 10 and a running surface 21 of the middle rail 20. A free-running segment 23 is formed as a recess or bead in said running surface 21 of the middle rail 20. FIG. 3 shows the position of the rolling-element cage 4 in the retracted state of the pull-out guide, wherein the three first rolling elements 1 are arranged in this position of the pull-out guide in the free-running segment 23. The free-running segment 23, as also the free-running segment 33 of FIG. 2, is characterized in that the respective running surfaces, which in this case are the running surfaces 11 and 21 of the involved guide rails, i.e. the guide rails 10, 20 in this case, are further spaced from each other than in the remaining progression of the guide rails. The first rolling elements 1 are accordingly relieved in the illustrated retracted position of the pull-out guide and only the second rolling elements 2 carry the load of the guided furniture part.

Figure 4A:
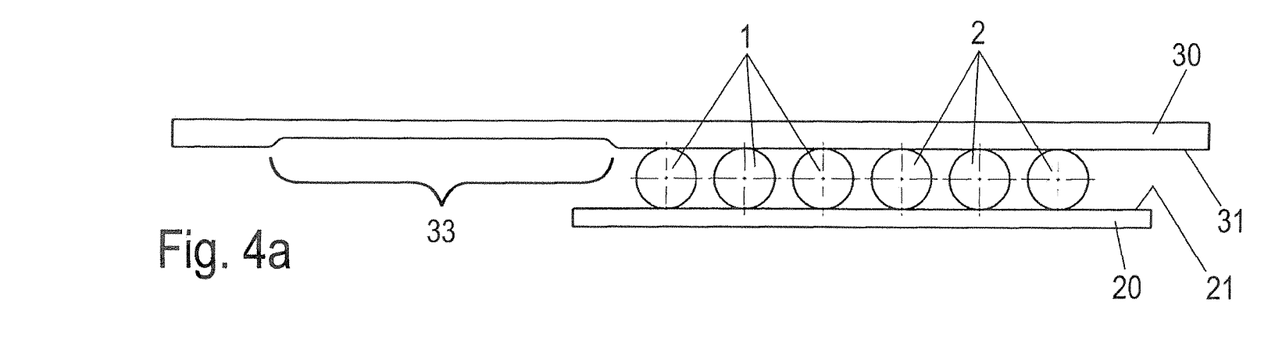
Figure 4B:
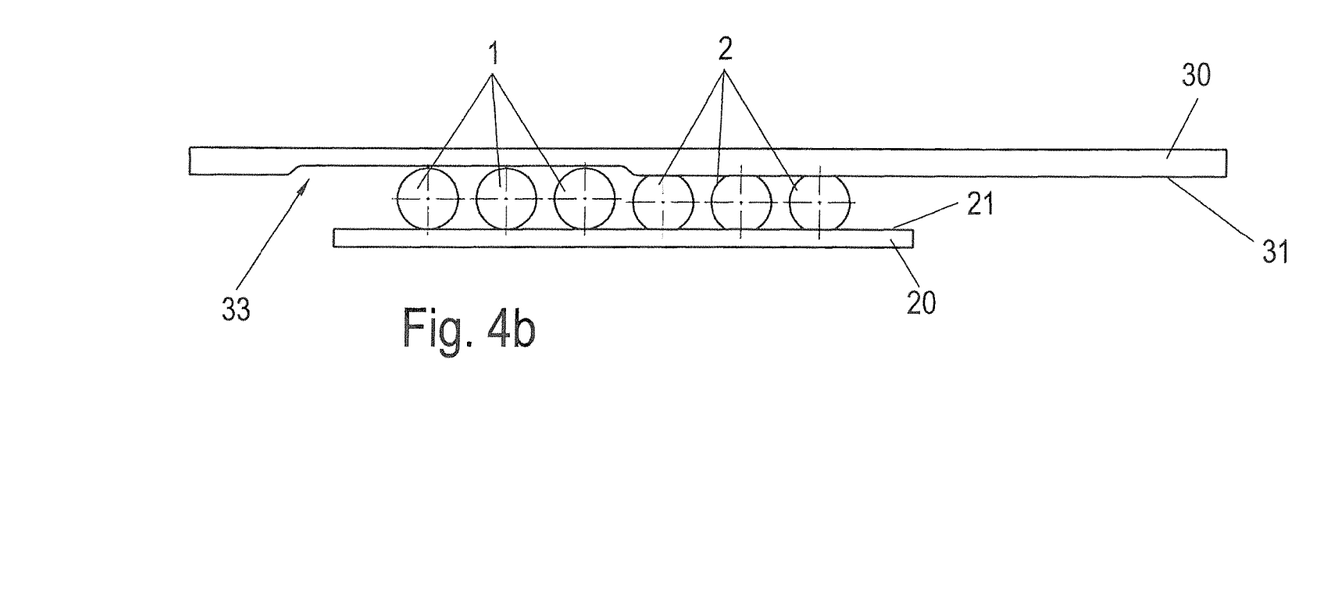
Figure 4C:
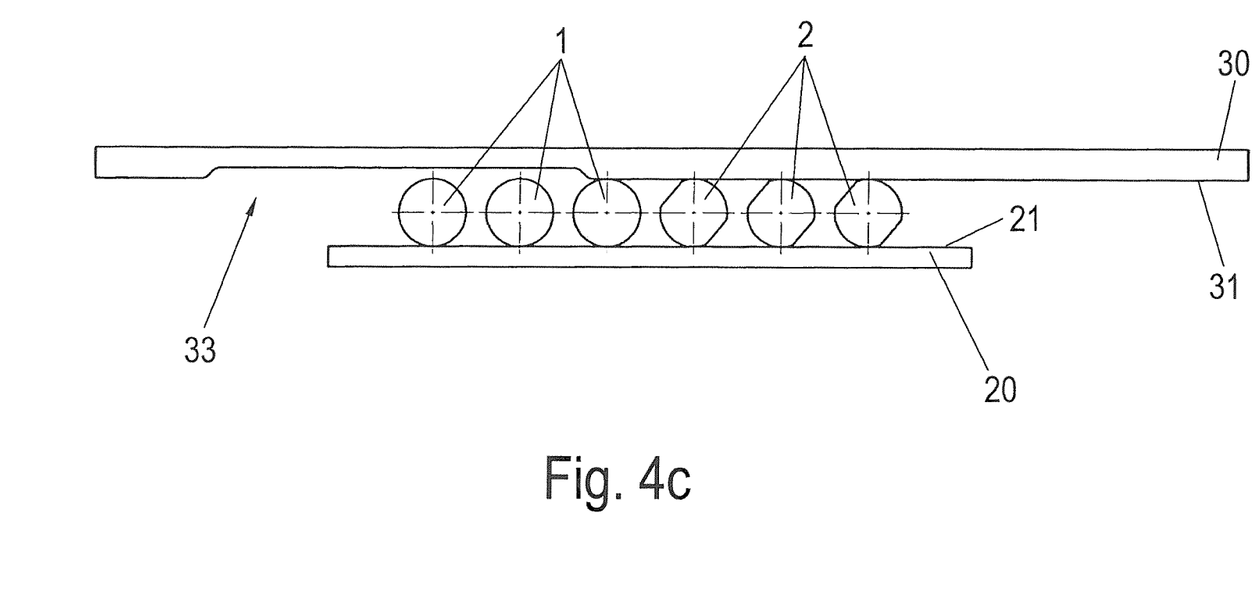

FIGS. 4a-4c show the region of one of the roller bearings of a pull-out guide for three different positions of the pull-out guide in three individual images. FIGS. 4a-4c show the bearing region between the running rail 30 and the middle rail 20 according to FIG. 2 by way of example. FIGS. 4a-4c can also similarly be applied to the body rail 10 and the middle rail 20 or to two random guide rails.

FIG. 4a shows a partly extended position of the pull-out guide. In this position, none of the rolling elements 1, 2 is situated in the free-running segment 33. All six first and second rolling elements 1, 2 roll off between the running surfaces 21 and 31 and contribute equally to the bearing. It is further assumed that none of the first or second rolling elements 1, 2 is deformed. FIG. 4a thus indicates the normal state during actuation of the pull-out apparatus.

FIG. 4b shows the pull-out guide in a retracted state. In this state, the first rolling elements 1 are disposed in the region of the free-running segment 33, whereas the second rolling elements 2 are disposed outside of the free-running segment 33 between the running surfaces 21 and 31. FIG. 4b shows the state of the second rolling element 2 after a longer idle time in this position. The second rolling elements 2 are deformed by the weight that is carried by them on the contact surfaces to the running surfaces 21 and 31. The deformation is shown in a strongly exaggerated manner in comparison with reality in this schematic drawing of FIG. 4b. In actual fact, the deformation lies in the magnitude of one-tenth or a few tenths of millimeters (mm), for example, less than or equal to 0.1 mm, at a typical diameter of the rolling elements 2 in the range of a few millimeters, e.g. 6 mm. Accordingly, a difference in the distance of the running surfaces 23, 33 within and outside the free-running segment 33 in this magnitude of one-tenth or a few tenths of millimeters is sufficient to completely or at least substantially relieve the first rolling elements 1 in the free-running segment 33.

The flattening of the second rolling elements 2 as shown in FIG. 4b would lead to uneven running of the second rolling elements 2 and thus to an increased vibration and noise level during actuation of the pull-out guide according to the prior art in which the free-running segment 33 is not provided. This impairment is reversible in the case of a suitable selection of materials because the second rolling elements 2 assume their almost round shape again as a result of the kneading processes connected to the movement.

FIG. 4c shows the effect of the free-running segment 33 in accordance with the invention when moving the pull-out guide from the idle position shown in FIG. 4b. Already after a short relative movement of the guide rails 20, 30 with respect to each other, the one of the first rolling elements 1 which is at the right in FIG. 4c leaves the free-running segment 33. During further extension of the pull-out guide, the middle and the left one of the first rolling elements 1 leave the free-running segment 33. The distance between the running surface 21 of the middle rail 20 and the running surface 31 of the running rail 30 is determined by the diameter of the first rolling elements 1. Since the first rolling elements 1 were not deformed as a result of the relief in the free-running segment 33 in the idle position, they are not provided with any flattened portions which could lead to vibrations and an increased running noise. The running rails 20 and 30 substantially maintain their distance as a result of the first rolling elements 1, even in a position in which the second rolling elements 2 have carried out half a rotation and face the running surfaces 21 and 31 with their flattened portions. The flattened portions of the second rolling elements 2 may produce a slight elongation of the rolling elements in the direction extending transversely thereto, which does cause any disturbances with respect to vibration and noises, but which leads to a kneading of the second rolling elements 2, as a result of which they assume their original round shape again after one or several actuations of the pull-out guide. Furthermore, a relaxation to the original shape can also occur without kneading after the relief from the position shown in FIG. 4*b*.

The edges of the free-running segment 33 are shown by way of steps in FIG. 4 as an example. A softer transition such as a ramp can also be provided alternatively and advantageously, so as to facilitate the travel of the first rolling elements 1 out of the free-running segment 33 and to prevent that the user can feel the transfer.

The invention claimed is:

1. A pull-out guide comprising at least two pull-out rails, each having at least one running surface, between which at least one first rolling element and at least one second rolling element are arranged, the at least one first rolling element and the at least one second rolling element rotatably retained in at least one corresponding rolling-element cage, wherein the at least one first rolling element and the at least one second rolling element have an identical nominal diameter, wherein at least one of the running surfaces has a free-running segment, in which the at least one first rolling element is positioned in a retracted state of the pull-out guide, wherein the running surfaces have a greater distance from each other within the free-running segment than outside the free-running segment, wherein several of the first rolling elements are arranged in a rolling element cage one after the other in a longitudinal direction of the pullout guide, and wherein the free-running segment has a length which is as at least great enough to accommodate two of the several first rolling elements.

2. The pull-out guide according to claim 1, wherein the free-running segment is formed as a bead, a recess, an embossed portion or a ramp.

3. The pull-out guide according to claim 2, wherein the free-running segment is integrated in one of the running surfaces.

4. The pull-out guide according to claim 1, wherein in the retracted state of the pull-out guide the first rolling elements are not in contact with both of the two running surfaces between which they are arranged.

5. The pull-out guide according to claim 1, wherein the distance between the running surfaces within the free-running segment and outside the free-running segment differs by less than 10% of the nominal diameter of the first and the second rolling element.

6. The pull-out guide according to claim 5, wherein the distance between the running surfaces within and outside the free-running segment differs by less than 5% of the nominal diameter of the first and second rolling elements.

7. The pull-out guide according to claim 1, wherein several second rolling elements also are arranged within the corresponding rolling-element cage one after the other in the longitudinal direction of the pull-out guide.

8. The pull-out guide according to claim 1, comprising further rolling elements in addition to the first and second rolling elements.

9. The pull-out guide according to claim 8, wherein the further rolling elements differ with respect to their diameter from the first and second rolling elements.

10. The pull-out guide according to claim 1, wherein the first rolling elements, the second rolling elements, or both the first rolling elements and the second rolling elements are made of a plastic.

11. The pull-out guide according to claim 1, wherein the first and the second rolling elements differ from each other with respect to one or more of their geometry, their material, their hardness and their width.

\* \* \* \* \*